ns Limited, St.
United States Patent [19]
St. Eve

[11] 3,890,083
[45] June 17, 1975

[54] EXTRUSION DEVICES

[75] Inventor: Daniel Robert St. Eve, Thornhill, Ontario, Canada

[73] Assignee: Leco Industries Limited, St. Laurent, Quebec, Canada

[22] Filed: May 30, 1973

[21] Appl. No.: 365,200

[52] U.S. Cl................................ 425/462; 425/133
[51] Int. Cl............................................... B29f 3/00
[58] Field of Search ............ 425/131, 133, 462, 463

[56] References Cited
UNITED STATES PATENTS

| | | | |
|---|---|---|---|
| 2,957,201 | 10/1960 | Fields et al. | 425/133 X |
| 3,802,826 | 4/1974 | St. Eve | 425/131 X |
| 3,809,515 | 5/1974 | Farrell | 425/133 |

FOREIGN PATENTS OR APPLICATIONS

| | | | |
|---|---|---|---|
| 374,149 | 6/1932 | United Kingdom | 425/131 |

*Primary Examiner*—Al Lawrence Smith
*Assistant Examiner*—James G. Smith
*Attorney, Agent, or Firm*—Robert J. Schaap

[57] ABSTRACT

A rotatable coextrusion die permitting coextrusion of two or more extrudable materials to form a multi-layered extrudable product. The device comprises a die body with a central core disposed within an elongated bore in the die body and spaced therefrom to form a coextrusion flow path. The central core is comprised of a plurality of material spreading members which are successively positioned in the direction of movement of the material. Each of the spreading members includes a plate having multi-point star-like patterns on each of the opposite surfaces thereof thereby forming a plurality of circumferentially spaced radially extending flow passages which open into the coextrusion flow path. An individual feeding tube is associated with each of the spreading members and the associated feeding tubes at one end extend into the associated spreading member and opens into the flow passages on opposite sides of the spreading plate in each spreading member. At their opposite ends, the individual feeding tubes are connected to one or more sources of extrudable materials. The die body and the central core are rotatable together about a fixed axis and are also rotatable with respect to the feeding tubes. The method for making the multi-layered extrudable product is also disclosed.

16 Claims, 11 Drawing Figures

EXTRUSION DEVICES

This invention relates in general to certain new and useful improvements in extrusion devices and method of use, and more particularly, this invention relates to coextrusion devices and the method of coextruding two or more layers of extrudable materials and where the device and method permit the production of coextruded materials which have improved physical characteristics.

The present invention relates to an improvement over the extruding device and method of the type described and claimed in Canadian Patent No. 922,463, dated Mar. 13, 1973, which relates to an apparatus and method for coextruding two or more layers of extrudable material. The extruding device and the method as taught in this Canadian Patent operate on principle where extrudable materials are passed through a die having a die body and central core with the core comprised of individual die-lands and grooves in or between the respective lands and the grooves on each of the die-lands communicate with a common feed path. A plurality of concentrically located feeding tubes are connected to two or more sources of extrudable material and to the grooves in each of the die-lands in order to provide material feeds to these die-lands and to the respective grooves.

The present invention represents a substantial improvement over the device and method taught in the aforesaid Canadian Patent in that the apparatus and method of the present invention employ spreading members including spreading plates having starlike patterns on opposite sides of each of spreading plates and which form a plurality of radially extending flow passages on each of the opposite sides of each of the spreading plates and these flow passages communicate with the coextrusion flow path. In this way material melt is divided into two separate material stratum on each opposite side of each of the spreading plates and flow radially and merge at the edges thereof into continuous sheets of melt material thereby avoiding spider lines and other forms of imperfections to produce an unblemished product.

Coextrusion devices and method of extruding materials are well known in the extrusion art for producing various types of coextruded materials. U.S. Pat. No. 3,266,093 for example, discloses an apparatus for producing an extrusion product of two of more layers of extrudable materials which are extruded through a die orifice. The material is thereafter expanded to form a tube according to conventional blown tube techniques and thereafter collapsed to form tubing or sheeting or other material forms as may be desired.

Typically, in such coextrusion devices and methods, the coextrusion device per se includes a core or centrally mounted body having a hollow annular aperture therein, which may be either in the form defining a hollow tube or with a solid central protion. In the former case, a solid stream of material to be extruded is split by a splitter to form an annular ring, which is thereafter extruded, while in the latter case, the hollow annular ring is initially formed and extruded without undergoing any physical change in shape. In either case such devices employ a splitter, usually in the form of a pointed cone, or otherwise these devices use a solid core and this solid core in combination with die members define an annular ring aperture. To achieve suspension of the cone or core, supporting means extend through the annular aperture and hence the annular stream to connect with the die body. These supporting means are generally in the form of two or more support bars which extend across the die gap which carries the material to be extruded. The molten material, after passing over the supporting bars in the cone or core, is split and thereafter flows together to again form a continuous stream. When such material is extruded, spider lines or so-called "weld lines" which are hazy discontinuities are generated on the resulting film.

Then the extruded material is blown into a film, these spider lines or hazy discontinuities usually occur in the machine direction and mar the otherwise unblemished film. These spider lines betray the fact that the melt flow was divided and then rejoined as it advanced through the die. Regardless of any of the conventional die designs, the flow of material in the melt stage is divided at one or more points as it passes around the various mechanical elements that support the center core or so-called mandrel within the die body and these spider lines which result in the hazy discontinuities of the film cannot be eliminated by any known technique. These lines of joinder are particularly pronounced in the heavier gauges of laminated film where the defect typically shows up to a greater extent than in the extruded thinner gauge films.

A further requirement associated with high quality film or sheeting is that the products must have good roll geometry, that is the gauge thickness must have a substantially uniform depth across the width of the product. In the case of coextruding two or more layers of materials to form a laminated product, using the die structures conventionally associated with such procedures, it is not possible to provide the desired degree of gauge control since most common coextrusion devices are generally a one-piece unit. This construction renders it virtually impossible to provide gauge control by acting on the coextruded materials.

A second major problem which arises in connection with the use of the known extrusion device is that of cleaning and maintenance of these dies. It is well established that these dies must be kept relatively clean in production of sheet extrusions by blow molding or other known techniques, or otherwise inferior products will be produced. Gel materials and particles of degraded resin will typically appear visually prominent in a sparkling film thereby marring the appearance of the film when the extrusion die is relatively unclean. These impurities are not only visually undesirable, but more importantly, form weak points in the resultant film which tear easily and oftentimes materially interfere with the blow molding process. The disassembling and cleaning of most of the conventional dies is generally a time consuming and therefore costly venture. Accordingly, these dies are only cleaned when it becomes absolutely necessary and after a period of time, the quality of the product begins to decline as a result of extrusion through these relatively unclean dies.

With the present invention, applicant has developed a device and method whrein two or more layers of extrudable materials may be coextruded through a center-fed unitary coextrusion device to produce coextruded materials having improved roll geometry.

It is therefore the primary object of the present invention to provide an extrusion apparatus permitting the coextrusion of materials which can be combined to form a high quality relatively unmarred and unblemished coextruded product.

It is another object of the present invention to provide an apparatus of the type stated which is capable of producing coextruded products by passing extrudable materials through spreading members to provide overlapping flows of material which are ultimately combined to form the coextruded product.

It is a further object of the present invention to provide a coextrusion die which can be inexpensively manufactured and which is highly efficient in producing multi-layered coextrusion materials on a mass production basis.

It is an additional object of the present invention to provide a coextrusion die which can be rapidly and easily disassembled for cleaning, thereby lending to efficient production of sheet extrudable films which are relatively free of impurities and eliminate costly downtime.

It is another salient object of the present invention to provide a method of making coextruded products by passing extrudable materials from coaxial feed paths through flow paths on opposite sides of spreader members and combining these materials from the flow paths on each of the spreading members to form the coextruded product.

With the above and other objects in view, applicant's invention resides in the novel features of form, construction, arrangement and combination of parts presently described and pointed out in the claims.

More particularly, in accordance with this invention, there is provided a rotatable coextrusion die comprising an outer die body and feeding means for feeding at least two sources of extrudable material, the outer die body having a common annular flow path terminating in a die lip. A plurality of material spreading members are located within the die body and each such spreading member being comprised of a die-plate having a plurality of flow passages on opposite sides thereof and which communicate with said common annular flow path to provide a continuous flow of overlapping material. The feeding means comprises at least two individual feeding means, each being associated with one of the die plates and these individual feeding means communicate with flow passages on the associated die-plate, each of the feeding means being adapted to feed an extrudable material to the flow passages, whereby all of the extrudable materials from each of the feeding means is combined to form a multi-layered extrudable material.

According to the process of the present invention for producing a coextruded product, the process comprises feeding each of a plurality of extrudable materials through individual coaxial feed paths, each path being established for each such material, directing the extrudable material from each feed path through a spreading member associated with each particular feed path, and directing the material entering the spreading member through a plurality of flow paths on opposite sides of each spreading member and which flow paths are essentially perpendicular to the feed paths. In this way, a melt stream of the extruded materials is formed on opposite sides of each of the spreading members. These melt streams from the opposite sides of each of the particular spreading members are combined as the materials forming these melt streams pass through the flow paths and into a common coextrusion path. Thereafter, these melt streams from each of the spreading members are combined to provide a multi-layered product formed of the extrudable materials.

In the above coextrusion die, the outer die body preferably comprises a rotatable die body which is rotatable about a fixed axis and having a common annular coextrusion flow path therein with the flow path terminating in an exterior extrusion lip. The central core disposed within the die body preferably includes a plurality of spreading members which are successively located in the direction of movement of the extrudable material. Each of these spreading members preferably comprise a mandrel-forming plate having a plurality of radially extending flow passages on opposite sides thereof and communicating with the coextrusion common flow path. Star-like spreader patterns are formed on each side of the mandrel-forming plates and, in turn, form the plurality of radially extending flow passages which are circumferentially spaced about the plate on each of the opposite sides thereof. In addition, the flow passages on one side of the plate are preferably offset from the flow passages formed on the opposite side thereof. The spreading members in a preferred embodiment of the invention comprise a die-base with the mandrel-forming plate serving as a spreader plate and being disposed in operative relationship to the die-base in order to form an annular meterial receiving passageway therebetween and where the radially extending flow passages open into the annular material receiving passageway. A die mandrel is operatively mounted in conjunctive relationship to the die-base and the spreader plate. In addition, a die ring is operatively located around the die-mandrel to continue the annular material passageway between the die mandrel and the die ring.

Most desirably, the radially extending flow paths formed on opposite sides of the spreader plate merge into the annular material passageway so that meltstreams formed of the extrudable material on each of the opposite sides of the plates are combined in this common extrusion path. Furthermore, the individual flow paths established by each of the spreader plates are arranged in a staggered relationship to each other. An extrudable material from the lowermost individual spreading member in the flow direction of the material forms an annular ring of extrudable material in the common coextrusion flow path which is coated interiorly with a second extrudable material discharged from flow paths of the second spreading member. Where more than two materials are employed, the second material will, in turn, be subsequently coated with further extrudable materials. For the sake of expediency, the die body may be constructed of two portions including an outer shell portion and an inner core portion, with the common annular coextrusion flow path being defined by an annular gap between the inner core and the outer shell portions.

In an advantageous form, the feed means for the rotatable coextrusion die of the present invention comprises a corresponding number of non-rotatable continuous feed paths to the number of individual spreading member flow discharge paths whereby each flow discharge path may be fed separately thus enabling different extrudable materials to be formed into a multilayered material. To this end, each of the feeding paths is in communication with the respective flow paths of a particular spreading member at one end, and at the other end is adapted to be connected to a source of extrudable material. In a particularly preferred arrangement, the individual feeding means, aligned in a common axis, preferably the axis about which the die is adapted to rotate, are in the form of concentric flow paths separated by suitable means. Such means may be for example, a plurality of concentric hollow tubes mounted within one another to define the continuous feed paths for the respective extrudable materials. In a preferred form, each concentric tube terminates directly with respect to respective flow paths of the respective spreading members in the rotatable portion of the die, with suitable bearing and sealing surfaces being included to permit rotation of the die about the concentric tubes.

The number of concentric tubes employed may be equal to the number of individual flow discharge paths that the respective feed tubes are adapted to feed although there may be one less than the number of flow discharge paths whereby the exterior surface of the outermost feed tube forms the interior wall for the outermost feed path, with the exterior surface of the outermost feed tube being defined by the die body and/or suitable mounting means forming a portion of the non-rotatable feeding system. The latter arrangement is preferred for the sake of expediency and economics.

Suitable means are provided for permitting relative rotation between the die body and the feeding means and, more particularly, any suitable bearing surface permitting rotation between the respective rotatable and non-rotatable components may be employed. To this end, the feeding system may include suitable mounting and supporting means with one or more bearing surfaces thereon, and one or more movable ball bearing or similar type arrangements included between the respective cooperating engaging surfaces of the die body and feeding means.

The various components for the rotatable coextrusion die of the present invention may be made from materials well known to those skilled in the art and the choice of materials is not critical having regard to the requirements of the various components to withstand heat and/or pressure. Typically, the die body is made out of various types of steels or alloys, with suitable sealing gaskets of e.g. "TEFLON" or glass-filled "TEFLON" being included to prevent leakage.

Any suitable means may be provided for rotating the outer die body member with respect to the feeding means, such means including, for example, reciprocating means adapted to reciprocate the outer die shell between an initial and terminal point, usually defined by a path of parital rotation of the outer die shell member. In the alternative, means may be provided for continuously rotating the outer die shell about 360°.

From the above, it will be understood that the die body is rotated relative to the feeding means, at the point where the feeding means introduce or feed the respective extrudable materials into the respective flow paths of the die body. This has the advantage that the extrudable material from the respective feeding means is fed into the flow paths with the material being uniformly distributed, which results in improved roll geometry for the extruded material.

It will be understood that the device and process of the present invention could be modified to include more than two flow paths and hence more than two feed streams; in the case of a desired five layered coextruded product, five separate feed streams and five separate flow paths may be employed, etc. In addition to the process and apparatus of the present invention providing the above advantages, they also provide superior and improved roll geometry to coextruded materials, and provide positive gauge control. The apparatus and process also have the further advantage that they are relatively simple and economical to carry out.

In carrying out the process, employing the coextrusion device of the present inventiion, the respective materials to be coextruded may be provided by one or more extruders. Extruders per se are well known in the art and any of a number of commercially available extruders may be employed for this purpose. Typically, in the case of coextruding three layers, each may be of the same material or alternately, may be of different materials in which case separate extruders are employed.

The flow of material to be extruded from an extruder is introduced into the respective inlet conduit under heat and/or pressure, depending on the type of material being employed. In all cases, the flow rate and pressure of the materials being introduced should be maintained below the point at which they would cause turbulence as this has been found to provide undesirable side effects. If turbulence was created, the coextruded materials would be distorted resulting in a marred or otherwise undesirable appearance when compared to a condition where no turbulence existed. Control of the amount of material being introduced, expressed as the flow rates, may be provided by controlling the amount of flow of the material from the various extruders, so as to provide the desired amount of material.

The types of materials which can be processed according to the present invention may vary widely. A representative non-limiting list of such materials includes, for example, polyethylene of high, medium or low density, acetal, methyl methacrylate, ethyl cellulose, cellulose acetate, cellulose acetate butyrate, nylon, polypropylene, co-polymerized polyolefins, polyalomer, plycarbonate, poly I butene polychlorotrifluoroehtylene, polytetrafluoroethylene, fluorocarbon, polystyrene, styrene terpolymers, vinyl acetate, vinyl alcohol, vinyl butyral, binyl chloride rigid, vinyl chloride acetate, vinyl chloride elastomeric compounds, rubber extrusion compounds, chlorinated rubber, hard rubber, silicone rubber and compounds, all extrudable thermosetting compounds such as Mylar, phenolics and epoxies, cellophane and paper pulp compounds.

With reference to the above-mentioned compounds, their use is intended to denote that the various additives associated with the utility of such resins may be included as desirable. Thus, various anti-slip, anti-block and like additives may be employed and incorporated into or with the resins. The choice of materials depends on the nature of the product desired. In general, the choice of materials can be such that each is compatible with the other to form a non-separable laminate. Alternately, the materials may be selected so that they are indirectly compatible, and will be susceptible to delamination. These latter combinations are desirable and useful in providing layered bags or similar containers.

The present invention can be used to produce laminated products in which any or all of the individual layers of extrudable substances are non-self-supporting, but in which the total product preferably is self-supporting. The total thicknesses of the individual layers may range from 0.0002 inch to 0.015 inch. In a combined form, the total number of layers may result in a film having a thickness of between 0.0004 inch to about 0.020 inch although it will be understood that the layers may be formed of different thicknesses.

Following formation of the annular stream and extrusion from the die lip, the resulting coextruded material may then be processed according to the conventional techniques for blown tube extrusion, as for example illustrated in Canadian Patent No. 460,963 showing inflation of the molten stream; subsequent collapse after cooling and winding-up of the resulting tube.

The products produced by the present invention may either be in the form of tubing or sheeting. In the latter case the tubing is normally slit following cooling, again according to conventional techniques. The coextruded materials may be post-treated for various purposes as for example, treatment by electrostatic discharge processes to render the products susceptible to further coating with surface coatings such as ink, for example.

Having thus generally described the invention, reference will now be made to the accompanying drawings, illustrating a preferred embodiment and in which.

Figures 1, 2:
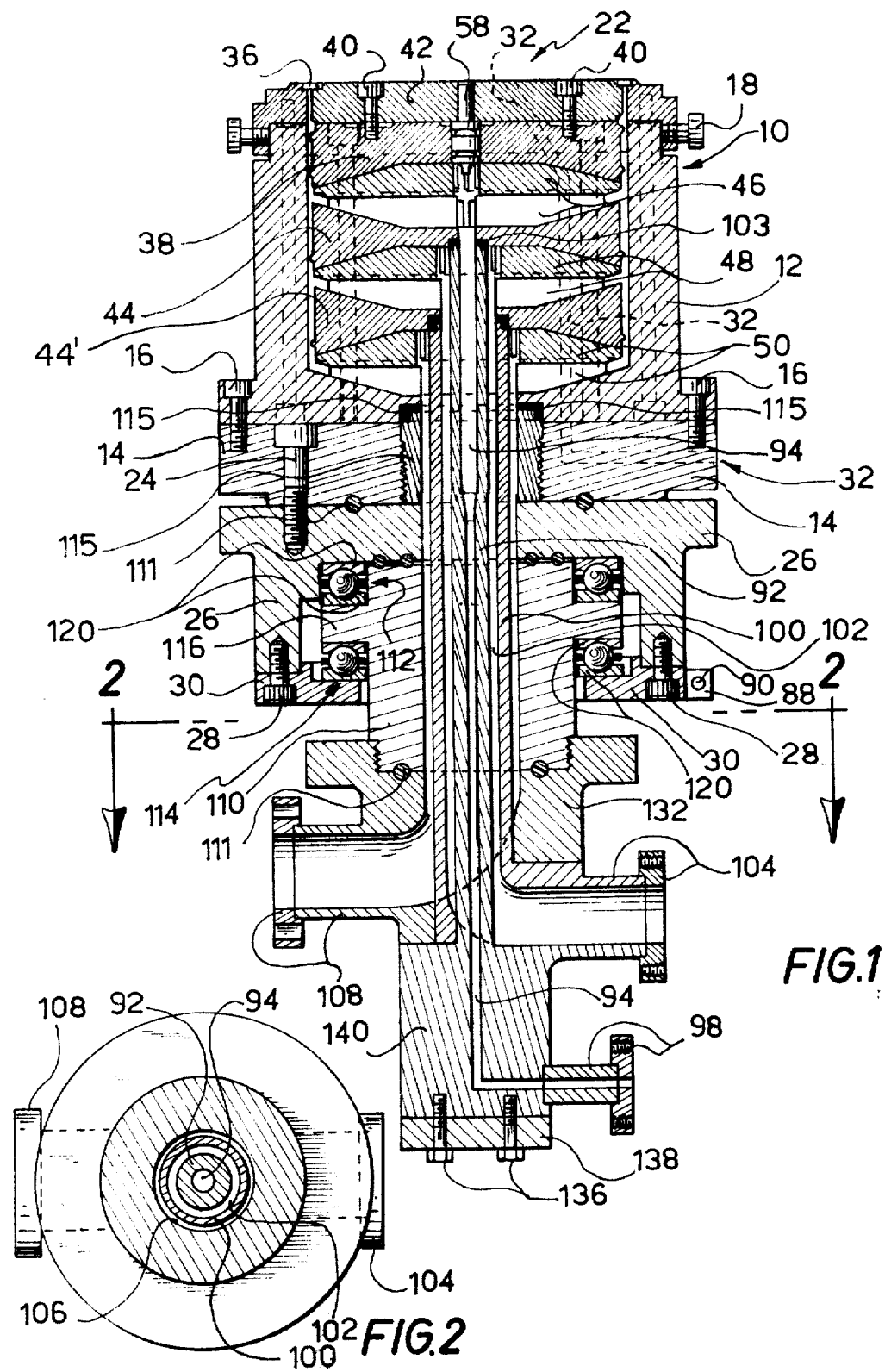
FIG. 1 is a vertical sectional view taken through a representative die according to the present invention.
FIG. 2 is a sectional view taken along line 2—2 of FIG. 1.

Referring now in more detail and by reference characters to the drawings which illustrate a preferred embodiment of the present invention, A designates a unitary die structure which includes an outer die body 10 having an upper outer body portion 12 which is regidly secured to an outer annular intermediate body portion 14 by means of mechanical fasteners such as bolts 16 or the like. Secured to the upper end of the upper outer body portion 12, by means of bolts 74, is an annular outer ring 20; bolts or screws 18 also provided permit minor adjustments to be made between the annular outer ring 20 and a central axially extending core 22, for purposes of positioning the core 22 with respect to the annular outer ring 20 and the die body 10. Rigidly secured to the intermediate body portion 14 by means of vertically positioned bolts 24 is a lower outer body portion 26. Also secured to the lower end of the lower outer body portion 26 by means of vertically positioned bolts 28 is a closure plate 30. It should be observed that the bolts used to secure the various body portions into a unitary structure are only one form of mechanical fastener which may be employed and other known attachment means may be used as well. Thus, the present invention contemplates various other forms of mechanical fasteners such as machine screws as well as other attachment means.

An air conduit 32 extends into the intermediate body portion 14 and through the central core 22 in the manner as illustrated in FIG. 1. The air conduit 32 opens at its upper end through an annular ring 42 to provide a source of controllable pressurized air for use following the coextrusion of various materials in production of the tube according to conventional blown tube techniques. In this connection, the other end of the air conduit 32 would be suitably connected to a suitable source of air under pressure, (not shown). The extrudable materials, which are generally thermoplastic materials, are in the molten state when passing out of the coextrusion die. As the material passes from the die in the form of an annular ring, air or other gas is introduced into the region bounded by the annular ring of material to create a tube or so-called "bubble" as the material is emerging from the coextrusion die. A pair of pinch rolls are usually spaced along the upper length of the extruded tube and air is trapped in the tube between the pinch rolls and the extrusion die. During this process, the tube is stretched to some extent by the air pressure contained within the tube and the take-off stretching in the machine direction. After a sufficient cooling period, the tube is collapsed so that a pair of flat surfaces in the film are disposed in facewise engagement with each other or in relatively flat juxtaposition to each other. Thereafter, the tube may be slit longitudinally and spread in the form of a relatively flat sheet which may or may not be easily stretched along one or more axes in the plane of the sheet. Again, the actual details of the conventional blown tube process are well known to those skilled in the art and reference may be made to Canadian Patent No. 460,963 and U.S. Pat. No. 3,466,356 which further illustrate and describe this process.

The central core 22 is spaced from the outer die body 12 by a distance which is sufficient to form a die gap which functions as a common annular coextrusion flow path 34 which terminates at its upper end in a dip lip 36. The core 22 is rotatable with the outer die body 12 about a fixed axis in a manner to be hereinafter described in more detail.

The core 22 comprises a first cylindrically shaped land portion 38 and a top plate 42 secured to the upper surface thereof by means of bolts or screws 40. Similar lands 44 and 44' are spaced therefrom in the core 22.

Figure 3:
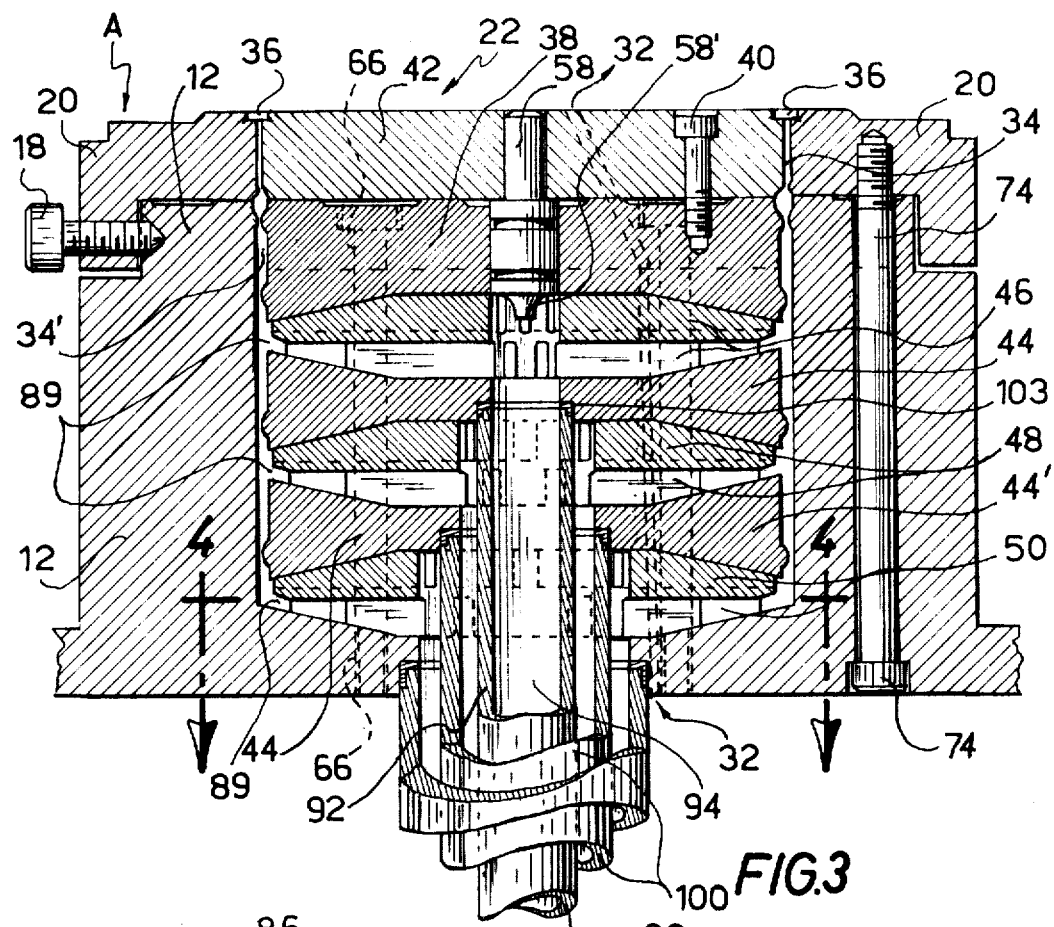
FIG. 3 is an enlarged vertical sectional view showing a series of successively located spreading members forming part of the apparatus as illustrated in FIG. 1.
Figure 4:
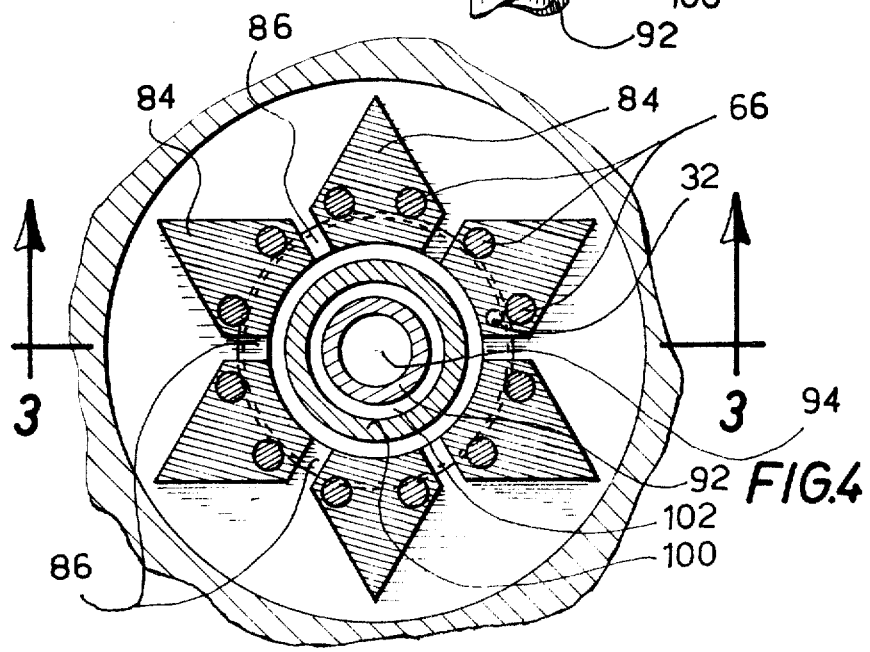
FIG. 4 is a section taken along the line 4—4 of FIG. 3 showing one of the individual spreading members of the die.

Extrudable material is entered into the common coextrusion flow path 34 through a plurality of substantially identical spreading members 46, 48 and 50 which are successively vertically spaced from each other in the direction of movement of the flow of extrudable material by the lands 44 and 44'. Inasmuch as the spreading members or so-called "spreading plates" 46, 48 and 50 are substantially identical in their construction, only one of these members 46 is described in detail herein and is more fully illustrated in FIGS. 4–11 of the drawings. The spreading member 46 generally comprises cylindrically shaped lower and upper spreading members such as, die bases 52 and 56, respectively, both of which are suitably reamed or otherwise formed with central recesses 54. The uppermost spreader member 46 is also suitably retained in position in the die core 22 by means of machine screws 40 and 66 although other forms of fasteners, e.g. bolts, may be used. An axially extending plug shaft 58 with pin 58' is fitted within a bore formed in the land portion or so-called "land" 38 and top plate 42, which also serves to seal the recesses 54 of the spreader member 46 against leakage at its upper end. The cylindrically shaped land 38 and the cylindrically shaped top plate 42 are disposed over the spreader plate 46 in the manner as illustrated in FIG. 3. In addition, the die lands 38 and 44 and the spreading members 48 and 50 are suitably retained together and in fixed relationship by means of the bolts 66 as aforesaid machine screws passing through apertures 60. The screws 66 and 40 are removed for the purpose of giving access to the die core which is accomplished by removal of the top plate 42. The screws 66 generally are only removed when the internal parts of the die core are cleaned and/or repaired.

The die is also suitably provided with an annular groove near its upper surface to accomodate the annular outer ring 20, in the manner illustrated in FIG. 3. It can thus be observed that an annular axially extending die gap 34' is formed between the die land 38 and the ring 20 and actuation of the adjustment screws 18 will permit regulation of the gap 34'.

The material which is passed into the die gaps 34 and 34', in a manner as described hereinafter, flows outwardly therefrom through the radially located annular extrusion orifice 36 which is formed between the top plate 42 and the ring 20. The common path for the coextruded material is continuous and integral with a flow path 89, as described hereinafter, where the extrudable materials will flow into the common coextrusion path 89 and will be combined therein in a manner to be hereafter described in more detail.

The spreader assembly 46, and the like assemblies 48 and 50, is shown in greater detail in FIGS. 3-11. The assembly has substantially the same construction on both the upper and lower or top and bottom sections 56 and 52 respectively and each includes a plurality of substantially identical sectors indicated generally by reference numeral 84, outlined and defined by centrally emanating recesses or channels 86 in the respective faces of the assembly. Although on the drawing six equal sectors have been shown, for both the top and bottom faces of the assembly, it will be appreciated that a greater or lesser number (e.g. between four and twelve or more) sectors can be employed. Preferably, both the top and bottom faces are of a substantially identical construction although it will be appreciated by those skilled in this art that this need not be so and a greater or lesser number could be included on one face as opposed to the number on the other face. Also, the sectors 84 on each face are of a generally identical nature and again this could be varied if desired — the most preferred configuration is that shown in the drawings, e.g. FIG. 6.

Recesses 86 defining the generally rectangular sectors 84 form radially extending melt passages or so-called "flow channels" in communication with the recesses 54 in the central area of the spreader assembly. These passages 86 form closed passageways when the respective assemblies are in face-to-face assembled relationship with the respective die-lands 38 and 44 or the lower portion of the body 12 of the die as the case may be. To this end, the shape of the die-lands and the lower portion of the die body, and that of the spreader assemblies, are formed so as to lie in intimate contact with each other.

One of the features of the spreader assemblies is that the flow channels 86 diverge radially outwardly toward the margins of the spreader assembly toward a relatively large portion 86', as indicated generally by reference numeral 86' so that in effect, the relatively narrow passageway feeds a relatively large portion 86' outlined by the walls of the sectors 84. These areas 86' are defined by the distance between adjacent sectors and in the embodiment shown by the fact that the star-like sectors 84 lie with the points or protruding edges extending radially outwardly from the central aperture 54 of the assemblies.

A further characteristic is the fact that the points or protruding edges of the star-like sectors 84 on opposite sides of the assembly, that is on the upper portion 56 and the lower portion 52 are offset from each other whereby the flow passages 86 and the wider terminal sections 86' are likewise offset from the corresponding portions on the opposed surface of the assembly. In the embodiment illustrated, with the resulting sectors forming a generally 6-point star pattern, each of the protruding points of the respective sectors are spaced from each other through an arc of approximately 60°. Accordingly, the points of the protruding edges on the opposite sides of the spreader assembly are offset from each other by approximately 30° each as will be evident from FIG. 6 in particular where the sectors on the bottom face 52 are shown in dotted lines as being roughly 30° offset from the corresponding sectors 84 on the upper face, when considering the terminal projecting or protruding points of the sectors.

Figure 5:
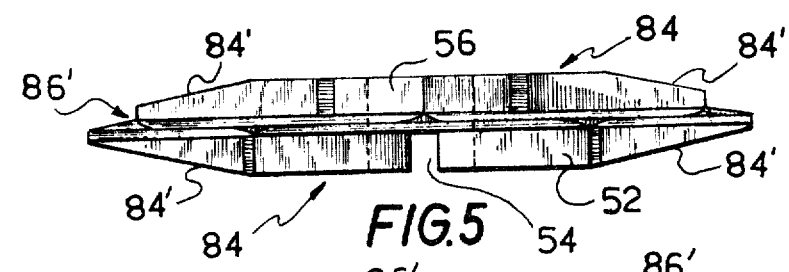
FIG. 5 is a side elevational view of one of the spreading members.
Figure 6:
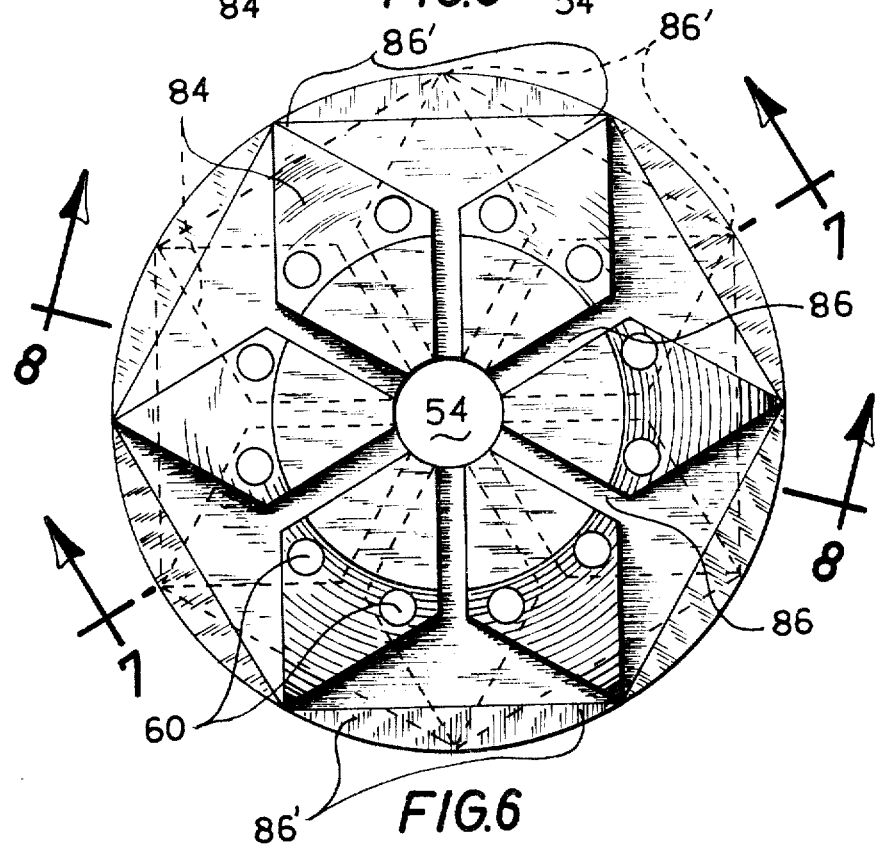
FIG. 6 is a top plan view of the member of FIG. 5.
Figure 7:
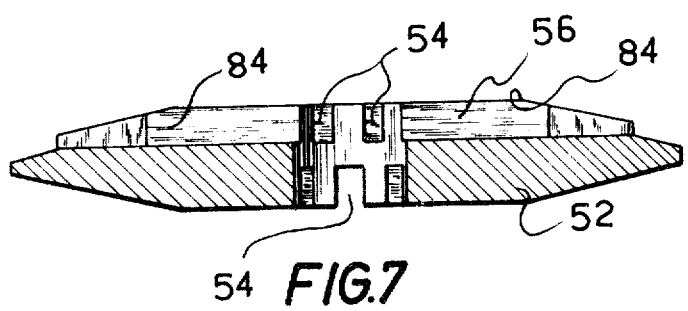
FIG. 7 is a section taken along line 7—7 of FIG. 6.
Figure 8:
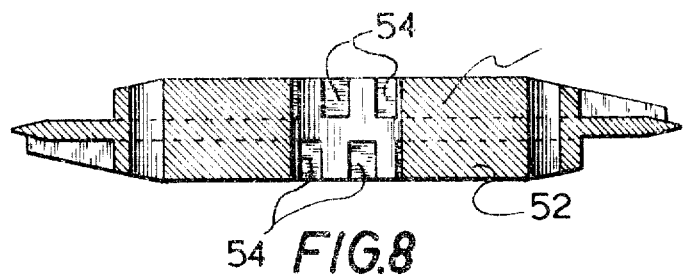
FIG. 8 is a section taken along the line 8—8 of FIG. 6.

The upper and lower faces of the spreader assembly preferably include tapering side margins, as best seen from FIGS. 5 and 7. Thus, the sectors 84 include tapering shoulders 84' terminating at the side margins of the sectors 84 in a die gap or common flow path indicated generally by reference numeral 89. This common flow path 89 receives the material extruded from both the upper and lower faces of the spreader assembly, as described hereinafter.

Figure 9:
FIG. 9 is a side elevational view of one of the die lands.
Figure 10:
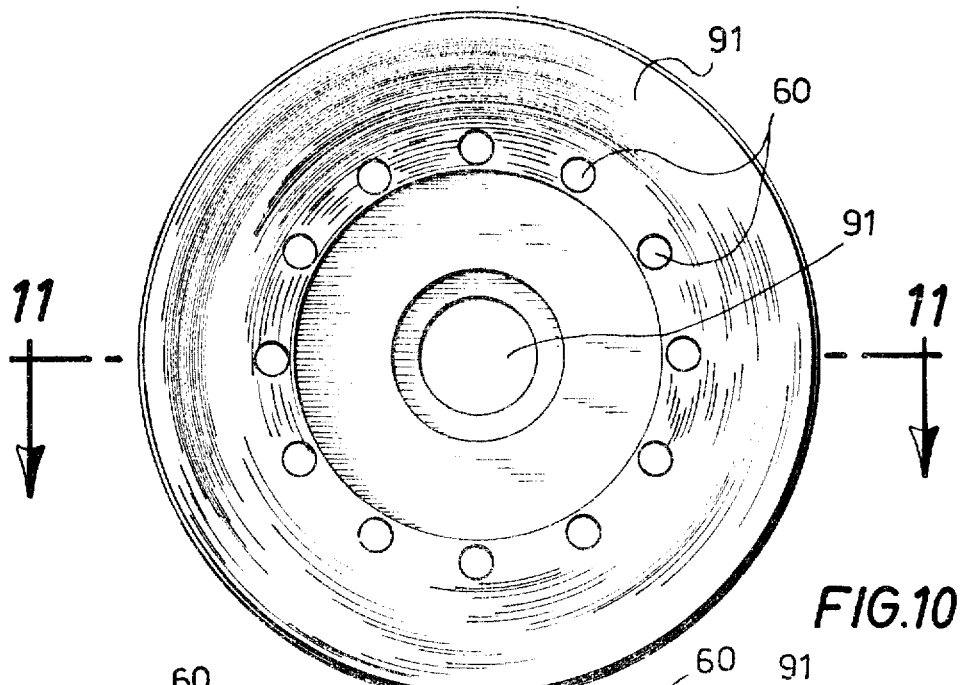
FIG. 10 is a top plan view of the die-land of FIG. 9.
Figure 11:
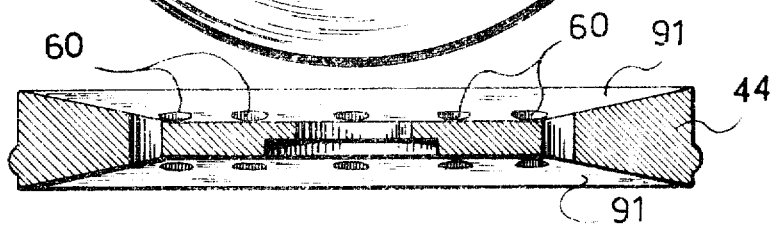
FIG. 11 is a section taken along the line 11—11 of FIG. 10.

The construction of the die-lands 38 and the pair denoted by reference numerals 44, are illustrated in greater detail in FIGS. 9-11. Essentially all three dielands are the same with the exception of the top portion of the die-land 38 which is relatively flat compared to the configuration of the bottom portion, and the configuration of the die-land 44. Each includes a "dish-shaped" surface 91 with an aperture 93 therein adapted to receive, in the case of the uppermost die-land 38, the terminal portion of the shaft 58 positioning the same; and in the case of die-lands 44, the feeding members for feeding the material, as described hereinafter. Located in the die-lands are apertures 60 which permit passage of the previously described bolts 66 therethrough. The size of the aperture 91 will thus depend on the appropriate land.

The extrudable material which is introduced into the spreader plate from the recesses 54, in a manner to be hereinafter described in more detail, is radially disbursed through the various radial flow passages 86 and these flow passages are joined on a circumference of the spreader assembly in the die gap 89. These melt streams of extrudable material will flow radially outward through these flow passages 86, which broaden and thin as they approach the outer edges of the diamond-shaped points in the larger areas 86' and where they rejoin, or weld, to form a continuous melt sheet. It should thus be observed that melt sheets are therefore formed on both of the opposite surfaces of the spreader assembly and these sheets of melt from each of the opposite sides of the spreader plate overlay and laminate with each other in the outer annular die gap 89. However, since the points of the star-shaped sectors on each of the opposite sides of the spreader plate are offset by approximately 30° in the manner as previously described, each weld in one sheet of the melt falls exactly between the weld lines on the other sheet of the melt. However, these weld lines are rarely visible even with the closest examination and when compared to weld lines from conventional dies, are far superior in that the weld lines generated with conventional dies are clearly obvious on casual examination. Thus, in the flow direction of the material, extrudable material discharged from the feeding source, as described hereinafter, through the recesses 54 and on the spreader assembly 46 is coated with the material discharged from the spreader member 48, which was, in turn, coated with the material discharged from the spreader member 50. The combined material flowing in the common annular extrusion flow path 34' and 34 is subsequently discharged through the die lip 36.

The outer rotatable die body may include any suitable means for causing the rotatable components to be rotatable about a fixed axis. Thus, for example, a suitable mounting member 88 provided with an aperture 90 therein may be rigidly connected to a portion of the outer body 12, such as the lower body portion 30. This mounting member 90 would be adapted to receive a mating arm of a powered device such as the arm of a reciprocating device (not shown) or a rotating mechanism (not shown) to effect rotation thereof. In essence, any of a number of known drive mechanisms for imparting rotation to the die body 10 may be employed.

The feeding system for the apparatus of the present invention is preferably non-rotatable with respect to the die body 10 and the central core 22, and is shown in the drawings as being non-rotatable with respect to the above described rotatable portions of the device. The feeding system generally includes a first hollow axial conduit 92 defining a feed channel 94 which communicates at its upper end with the apertures 54 associated with the first spreading mechanism 46. The conduit 92 thus feeds the apertures 54, which as described above communicate with the radial flow passages 86 in the spreader plates 52 and 56. Suitable sealing rings may also be employed, if desired, with respect to the pin 58 and the conduit 92. The other end of the conduit 92 is connected to a flange and related hardware 98 which is adapted to mate with the outlet port of an extruder (not shown).

A second hollow conduit or conduit 100 concentric with the conduit 92 defines a hollow passageway 102 which communicates with the apertures or recesses 54 of the spreader member 48 to supply extrudable materials thereto for movement through the assembly 48. At its other end, the hollow passageway 102 communicates with an aperture in a flange and related hardware 104 which is adapted to mate with the outlet port of an extruder (not shown). Again, suitable gaskets or sealing members 103 may be employed to seal the gap between the end of the conduit 100 and the spreading assembly 48 in addition to forming a bearing surface against which the spreading member 48 may rotate.

A third supply passageway is indicated by reference numeral 106 and which communicates at its upper end with the recesses 54 of the spreader assembly 50. In this way, the extrudable material is introduced into the spreading member 50 for movement through the flow passages 86 associated with the spreading member 50. At its other end, the passageway 106 communicates with an aperture formed in a flange and related hardware 108 which is also adapted to mate with the outlet port of an extruder (not shown).

The passageway 106 is concentric with the passageway 102 and is defined by the exterior surface of the conduit 100 and various portions of the non-rotatable body and rotatable body as presently defined. Alternatively, a separate concentric tube may be employed, similar to tubes 92 and 100, to define the passageway 106. More particularly, the lower portion of the passageway 106 is defined by a non-rotatable cylindrical supporting and mounting sleeve 110 and the upper portion by a threaded bushing 115 connected to the rotatable intermediate die body 14. Again, one or more sealing gaskets, such as gaskets 111 between the upper body portion 12 and the intermediate body portion 14, and the sleeve 110 and the assembly 132, are included to prevent leakage. Likewise a seal 109 may be included, between the bushing 115 and the lower portion of the body 12.

To permit relative rotation between rotatable components of the die body and the non-rotatable feeding system, there is provided a pair of spaced upper and lower roller bearings or bushings 112 and 114 mounted between the lower die portion 26 and a laterally projecting flange 116 on the cylindrical sleeve 110, the latter being concentrically disposed about the feeding system as illustrated in FIG. 1. The bushings 112 and 114 are of the type which include upper and lower races for roller bearings such as those indicated by reference numeral 120. Thus, for example, in the bushing 116 the upper portion of the race of the roller bearing 120 rotates with the rotatable portion of the die and the lower race does not rotate. The reverse is true with respect to the lower portion 114 wherein the upper race is stationary and the lower race thereof rotates.

The lower portion of the sleeve 110 threadedly engages a non-rotatable mating member 132 which is provided with the annular sealing ring 111 located therebetween. The bottom portion of the die includes bolts 136 which serve to anchor a cap portion 138 to the bottom extension 140 of this nonrotatable portion.

Thus, there has been illustrated and described a novel coextrusion die which is capable of permitting coextrusion of a plurality of extrudable material and which fulfills all the objects and advantages sought therefor. Many changes, modifications, variations and other uses and applications of this die will become apparent to those skilled in the art after considering the specification and accompanying drawing. Thus, for example, the invention contemplates that the core portion 22 may be one piece as illustrated or may be composed of a plurality of separate pieces and other various techniques may be employed in this die construction. Therefor, all such changes, modifications, variations and other uses and applications which do not depart from the spirit and scope of the invention are deemed

I claim:

1. A rotatable coextrusion die comprising an outer die body and feeding means for feeding at least two sources of extrudable material, said outer die body having a common annular flow path terminating in a die lip, a plurality of material spreading members located within said body, each such member being comprised of a die-plate having a plurality of flow passages on opposite sides thereof and which communicate with said common annular flow path to provide a continuous flow of overlapping material streams, and said feeding means comprising at least two individual feeding means and each communicating with flow passages associated with one of said die-plates, each of said feeding means being adapted to feed an extrudable material to said flow passages, whereby all of the extrudable materials from each feeding means is combined to form a multi-layered extrudable material.

2. The rotatable coextrusion die of claim 1 further characterized in that said feeding means and die body are rotatable relative to one another to thereby control the roll geometry of said multi-layered extrudable material.

3. A rotatable coextrusion die permitting coextrusion of a plurality of extrudable materials, said die comprising an outer die body, a central core disposed within said outer die body forming an annular coextrusion flow path therebetween, said central core being comprised of a plurality of material spreading members successively positioned in the direction of movement of said extrudable materials, each of said spreading members including a mandrel forming plate forming a plurality of radially extending flow passages on opposite sides thereof and communicating with said coextrusion flow path to provide a continuous overlapping flow of material streams, and an individual feeding means operatively associated with each of said material spreading members and each feeding means communicating with the flow passages associated with one of said spreading members to deliver an extrudable material thereto, so that each of said extrudable materials may be combined in said coextrusion flow path.

4. The rotatable coextrusion die of claim 3 further characterized in that said feeding means and said die body are rotatable relative to one another to thereby control the roll geometry of said multi-layered extrudable material.

5. The rotatable coextrusion die of claim 3 further characterized in that said die body and said central core are rotatable relative to said feeding means.

6. The rotatable extrusion die of claim 3 further characterized in that said die body and said central core are mounted for simultaneous rotation about a fixed axis and are rotatable relative to a fixed feeding means.

7. The rotatable coextrusion die of claim 3 further characterized in that star-like spreader patterns are formed on each side of said mandrel forming plates and which form said plurality of radially extending flow passages.

8. The rotatable coextrusion die of claim 7 further characterized in that said star-like spreader patterns are six-point star patterns.

9. A rotatable coextrusion die permitting coextrusion of a plurality of extrudable materials, said die comprising an outer die body, a central core disposed within said outer die body forming an annular coextrusion flow path therebetween, said central core being comprised of a plurality of material spreading members successively positioned in the direction of movement of said extrudable materials, each of said spreading members including a mandrel forming plate constructed with star-like spreader patterns on each side of each said mandrel forming plate thereby forming a plurality of radially extending flow passages on each of the opposite sides of said mandrel forming plates which flow passages communicate with said coextrusion flow path to provide a continuous overlapping flow of material streams, said radially extending flow passages being circumferentially spaced from each other on each side of each said plates and the passages on one side of each of said plates being offset from the flow passages on the other side thereof, and an individual feeding means operatively associated with each of said material spreading members and each feeding means communicating with the flow passages associated with one of said spreading members to deliver an extrudable material thereto, so that each of said extrudable materials may be combined in said coextrusion flow path.

10. The rotatable coextrusion die of claim 9 further characterized in that said feeding means and said die body are rotatable relative to one another to thereby control the roll geometry of said multi-layered extrudable material.

11. The rotatable coextrusion die of claim 9 further characterized in that said die body and said central core are rotatable relative to said feeding means.

12. The rotatable coextrusion die of claim 9 further characterized in that said die body and said central core are mounted for simultaneous rotation about a fixed axis and are rotatable relative to a fixed feeding means.

13. A rotatable coextrusion die permitting coextrusion of a plurality of extrudable materials, said die comprising an outer die body, a central core disposed within said outer die body forming an annular coextrusion flow path therebetween, said central core being comprised of a plurality of material spreading members successively positioned in the direction of movement of said extrudable materials, each of said spreading members including a mandrel forming plate forming a plurality of radially extending flow passages on opposite sides thereof and communicating with said coextrusion flow path to provide a continuous overlapping flow of material streams, and an individual tubular feeding duct operatively associated with each of said material spreading members and each tubular feeding duct operatively opening at one end into the radially extending flow passages on the plate with which it is associated to deliver an extrudable material thereto, so that each of said extrudable materials may be combined in said coextrusion flow path, the other ends of each said tubular feeding duct being adapted for connection to a source of extrudable material.

14. The rotatable coextrusion die of claim 13 further characterized in that each of said tubular feeding ducts extends into said plates somewhat centrally thereof and opens into the flow passages on both the opposite sides thereof, and each of said tubular feeding ducts extending in a common axial direction.

15. A rotatable coextrusion die permitting coextrusion of a plurality of extrudable materials, said die comprising an outer die body, a central core disposed within said outer die body forming an annular coextrusion flow path therebetween, said central core being comprised of a plurality of material spreading members successively positioned in the direction of movement of said extrudable materials, each of said spreading members including a die base and a mandrel forming plate disposed in operative relationship to said die base and forming annular material receiving die gap therebetween, said mandrel forming plate also forming a plurality of radially extending flow passages on opposite sides thereof which open into said annular material receiving die gap and which also communicate with said coextrusion flow path to provide a continuous overlapping flow of material streams, and an individual feeding means operatively associated with each of said material spreading members and each feeding means communicating with the flow passages associated with one of said spreading members to deliver an extrudable material thereto, so that each of said extrudable materials may be combined in said coextrusion flow path.

16. The rotable coextrusion die of claim 15 further characterized in that a die mandrel is operatively mounted in conjunctive relationship to said die base and mandrel forming plate, and a die ring is operatively located around said die mandrel to continue the annular material passageway between said die mandrel and said die ring.

* * * * *